(12) United States Patent
Koyano

(10) Patent No.: US 8,141,116 B2
(45) Date of Patent: Mar. 20, 2012

(54) TIME MANAGEMENT APPARATUS AND TIME MANAGEMENT METHOD

(75) Inventor: Kenji Koyano, Higashiyamato (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 240 days.

(21) Appl. No.: 12/555,563

(22) Filed: Sep. 8, 2009

(65) Prior Publication Data

US 2010/0129058 A1 May 27, 2010

(30) Foreign Application Priority Data

Nov. 27, 2008 (JP) ................................. 2008-302801

(51) Int. Cl.
*G06F 3/00* (2006.01)
*G06F 13/00* (2006.01)
*H04N 5/445* (2006.01)
*H04N 9/80* (2006.01)
*H04N 5/76* (2006.01)

(52) U.S. Cl. ................ 725/50; 725/41; 725/55; 725/58; 725/61; 725/60; 386/252; 386/253; 386/257; 386/291; 386/292; 386/295; 386/297; 386/299

(58) Field of Classification Search .............. 386/291, 386/292, 295, 297, 299, 326, 252, 253, 257; 725/41, 50, 55, 58, 60, 61

See application file for complete search history.

(56) References Cited

U.S. PATENT DOCUMENTS

| | | | | |
|---|---|---|---|---|
| 7,146,093 | B2 * | 12/2006 | Kageyama et al. | ............ 386/318 |
| 7,224,886 | B2 * | 5/2007 | Akamatsu et al. | ............ 386/291 |
| 2004/0236788 | A1 * | 11/2004 | Sato et al. | ................. 707/104.1 |
| 2005/0076310 | A1 * | 4/2005 | Tada | ............................. 715/838 |
| 2006/0120691 | A1 * | 6/2006 | Itoh | ................................. 386/95 |
| 2009/0092373 | A1 * | 4/2009 | Hiyama | ........................... 386/83 |
| 2009/0320142 | A1 * | 12/2009 | Takahashi et al. | ............... 726/28 |

FOREIGN PATENT DOCUMENTS

| | | |
|---|---|---|
| JP | 11-126193 | 5/1999 |
| JP | 2001-008169 | 1/2001 |
| JP | 2003-085462 | 3/2003 |

(Continued)

OTHER PUBLICATIONS

Japanese Patent Application No. 2008-302801, Notice of Reasons for Rejection, mailed Apr. 20, 2010.

(Continued)

*Primary Examiner* — Thai Tran
*Assistant Examiner* — Daquan Zhao
(74) *Attorney, Agent, or Firm* — Blakely, Sokoloff, Taylor & Zafman LLP

(57) ABSTRACT

According to one embodiment, a content playback apparatus includes a read module which reads information that is recorded in a recording medium, a clock module which is managed such that tampering is prevented, and a control module which controls the read module and the clock module. Content information and time management information is recorded in the recording medium. The time management information includes date/time recording information indicative of a date/time at which previous playback of the content information is stopped, playback allowable period information, start date/time information of a playback allowable period and end date/time information of the playback allowable period. The control module includes a time management module which corrects the start date/time information of the playback allowable period and the end date/time information of the playback allowable period, with use of time information which is acquired from the clock module.

3 Claims, 3 Drawing Sheets

| | |
|---|---|
| [Time Stamp] | Updated by acquiring time from apparatus at time of content write and at time of content playback |
| [Start Date/Time] | Playback allowable period start date/time (s0) |
| [End Date/Time] | Playback allowable period end date/time (e0) |
| [Span] | Playback allowable period from start of playback |
| [Span:Start Date/Time] | Playback start date/time for span (ss) |
| [Span:End Date/Time] | Playback end date/time for span (se) |
| [First Play Flag] | Playback start flag for span |
| [Correction-completed flag] | Set in case where correction is made by mode B method |

FOREIGN PATENT DOCUMENTS

| | | |
|---|---|---|
| JP | 2003-110546 | 4/2003 |
| JP | 2003-297055 | 10/2003 |
| JP | 2005-250613 | 9/2005 |
| JP | 2005-251248 | 9/2005 |
| JP | 2006-202390 | 8/2006 |

OTHER PUBLICATIONS

Japanese Patent Application No. 2008-302801, Notice of Reasons for Rejection, mailed Nov. 24, 2009.

* cited by examiner

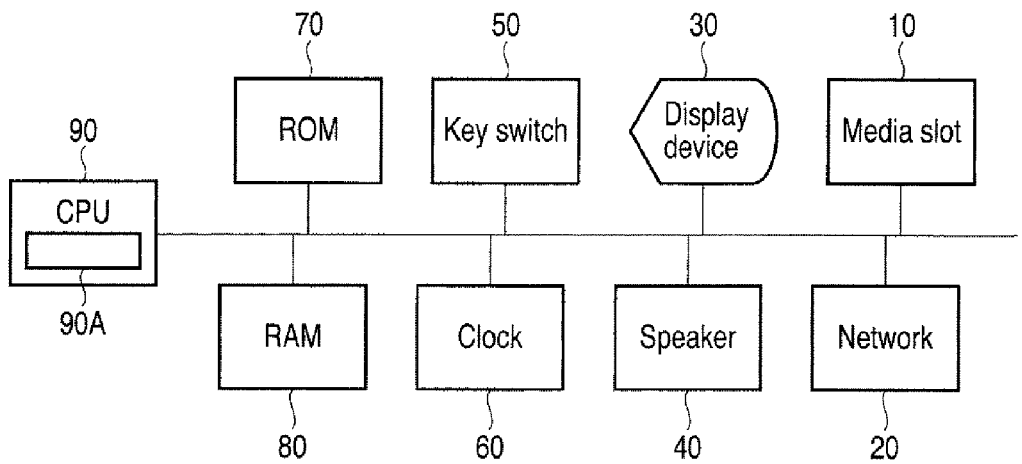

F I G. 1

| [Time Stamp] | Updated by acquiring time from apparatus at time of content write and at time of content playback |
| --- | --- |
| [Start Date/Time] | Playback allowable period start date/time (s0) |
| [End Date/Time] | Playback allowable period end date/time (e0) |
| [Span] | Playback allowable period from start of playback |
| [Span:Start Date/Time] | Playback start date/time for span (ss) |
| [Span:End Date/Time] | Playback end date/time for span (se) |
| [First Play Flag] | Playback start flag for span |
| [Correction-completed flag] | Set in case where correction is made by mode B method |

F I G. 2

TIME MANAGEMENT APPARATUS AND TIME MANAGEMENT METHOD

CROSS-REFERENCE TO RELATED APPLICATIONS

This application is based upon and claims the benefit of priority from Japanese Patent Application No. 2008-302801, filed Nov. 27, 2008, the entire contents of which are incorporated herein by reference.

BACKGROUND

1. Field

The present invention relates to a time management apparatus and a time management method.

2. Description of the Related Art

In recent years, with the prevalence of communication networks such as the Internet, users can acquire content information via networks. For example, in the case where content information is delivered via a network, information for managing a playback period of content information is, in some cases, added to the content information, thereby limiting the period during which viewing/listening is allowable.

There has conventionally been proposed a playback time management system wherein in the case of playing back information of recording module in which playback permission time data is recorded, an information playback permission time is determined after a standard time is acquired and the clock in a playback apparatus is corrected on the basis of the acquired standard time.

For example, as methods of managing the clock which is mounted in a content information playback apparatus, there are known a method (Mode A) without an anti-tampering function, and a method (Mode B) with an anti-tampering function which prevents an arbitrary change of time by a user.

In the case of recording time-managed content information in recording module such as a recording medium and playing back the time-managed content information by a plurality of playback apparatuses, the time information is managed by a plurality of clocks. Thus, there are cases in which a user who purchased the content information cannot play it back.

For example, in the case where the clock in the playback apparatus, which manages the clock by the Mode A method, is set at a future time relative to the present time, if content is played back by this playback apparatus, future time information is recorded as time management information in the recording module.

If the recording module in which such future time information is recorded is connected, for example, to an apparatus having a clock which is managed by the Mode B method, there occurs such a case that a content viewing/listening allowable period fails to be determined and content cannot viewed/listened to.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 1 is a view for describing an exemplary structure example of a content playback apparatus according to an embodiment of the present invention;

FIG. 2 is a view for explaining an example of time management information which is recorded in a recording medium in the content playback apparatus shown in FIG. 1;

DETAILED DESCRIPTION

Figure 3:
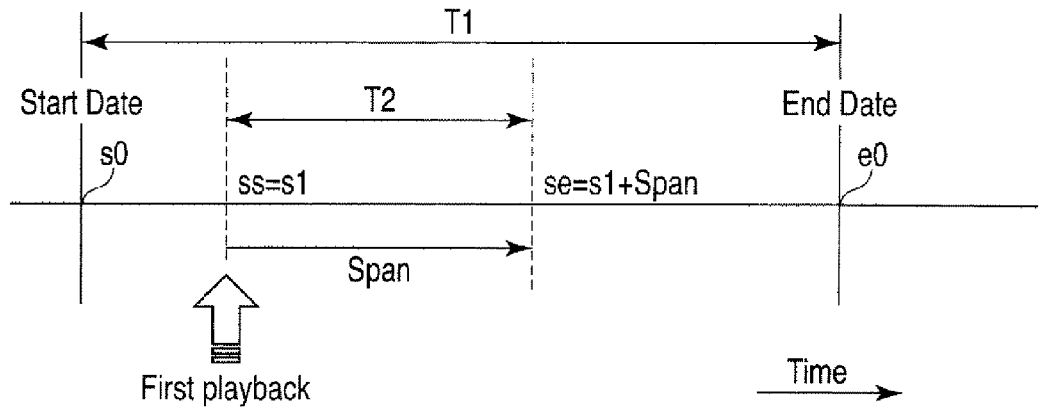
FIG. 3 is a view for explaining an example of a period during which content of a recording medium including the time management information shown in FIG. 2 can be played back.

Various embodiments according to the invention will be described hereinafter with reference to the accompanying drawings. In general, according to one embodiment of the invention, there is provided a time management apparatus comprising: a read module which reads information that is recorded in a recording module; a clock module which is managed such that tampering is prevented; and a control module which controls the read module and the clock module, wherein to-be-played-back information and time management information is recorded in the recording module, the time management information including date/time recording information indicative of a date/time at which previous playback of the to-be-played-back information is stopped, playback allowable period information of the to-be-played-back information, start date/time information of a playback allowable period and end date/time information of the playback allowable period, and the control module includes a time management module which corrects the start date/time information of the playback allowable period and the end date/time information of the playback allowable period, with use of time information which is acquired from the clock module.

A content playback apparatus and a time management method according to an embodiment of the present invention will now be described with reference to the accompanying drawing.

As shown in FIG. 1, the content playback apparatus according to the embodiment includes a media slot 10 functioning as a read module which reads out information that is recorded in a recording medium, such as an SD card, which serves as a recording module; a display device 30; a speaker 40; a key switch 50 which is operated by a user; a clock 60; a ROM (Read-Only Memory) 70 and a RAN (Random Access Memory) 80 serving as recording modules; and a CPU module 90 which controls the operations of these components. The components of the content playback apparatus are connected to a network 20 via a bus.

Operation information of the key switch 50 is delivered to the CPU module 90. In accordance with the delivered operation information, the CPU module 90 controls the display device 30 and speaker 40, and outputs predetermined video and audio. The ROM 70 and RAM 80 are used as temporary memory modules at the time of the operation of the CPU module 90.

The clock 60 is managed so that the time may not arbitrarily be changed by the user, and tampering may be prevented. Specifically, the content playback apparatus according to the embodiment is an apparatus which is managed by the Mode B method in which the time of the clock 60 is adjusted by the CPU module 90 so as to keep fixed precision.

For example, the time of the clock 60 is adjusted so as to keep fixed precision by standard time information which is obtained via the network 20.

In the case where time-managed content information (to-be-played-back information) is recorded in the recording medium that is connected to the media slot 10, time management information as shown in, for example, FIG. 2, is also recorded together. As shown in FIG. 2, [Time Stamp] is updated by acquiring time from the playback apparatus at a time of writing content data or at a time of playing back content data.

[Start Date/Time] (s0) is a playback allowable period start date/time of content information. [End Date/Time] (e0) is a playback allowable period end date/time of content information. [Span] is a playback allowable period from the start of playback of content information.

[Span: Start Date/Time] (ss) is a playback start date/time for [Span] information, that is, a start date of a playback allowable period. [Span: End Date/Time] (se) is a playback end date/time for [Span] information, that is, an end date of the playback allowable period.

[First Play Flag] is a playback start flag for [Span] information. [Correction-Completed Flag] is time correction completion information which is updated when the time management information has been corrected by the clock module which is managed by the Mode B method.

Of the above-described time management information, [Time Stamp], [Start Date/Time], [End Date/Time], [Span] and [First Play Flag: Reset] are written in the recording medium at the same time as the content information is written.

The content information, which is recorded at the same time as the time management information as described above, can be viewed/listened to during a range T1 between the date/time of [Start Date/Time] and the date/time of [End Date/Time], and, even in the range T1, the content information can be viewed/listened to only during a period T2 (between [Span Start Date Time] and [Span End Date Time]) of [Span] from the start of viewing/listening of the content information.

Figure 4:
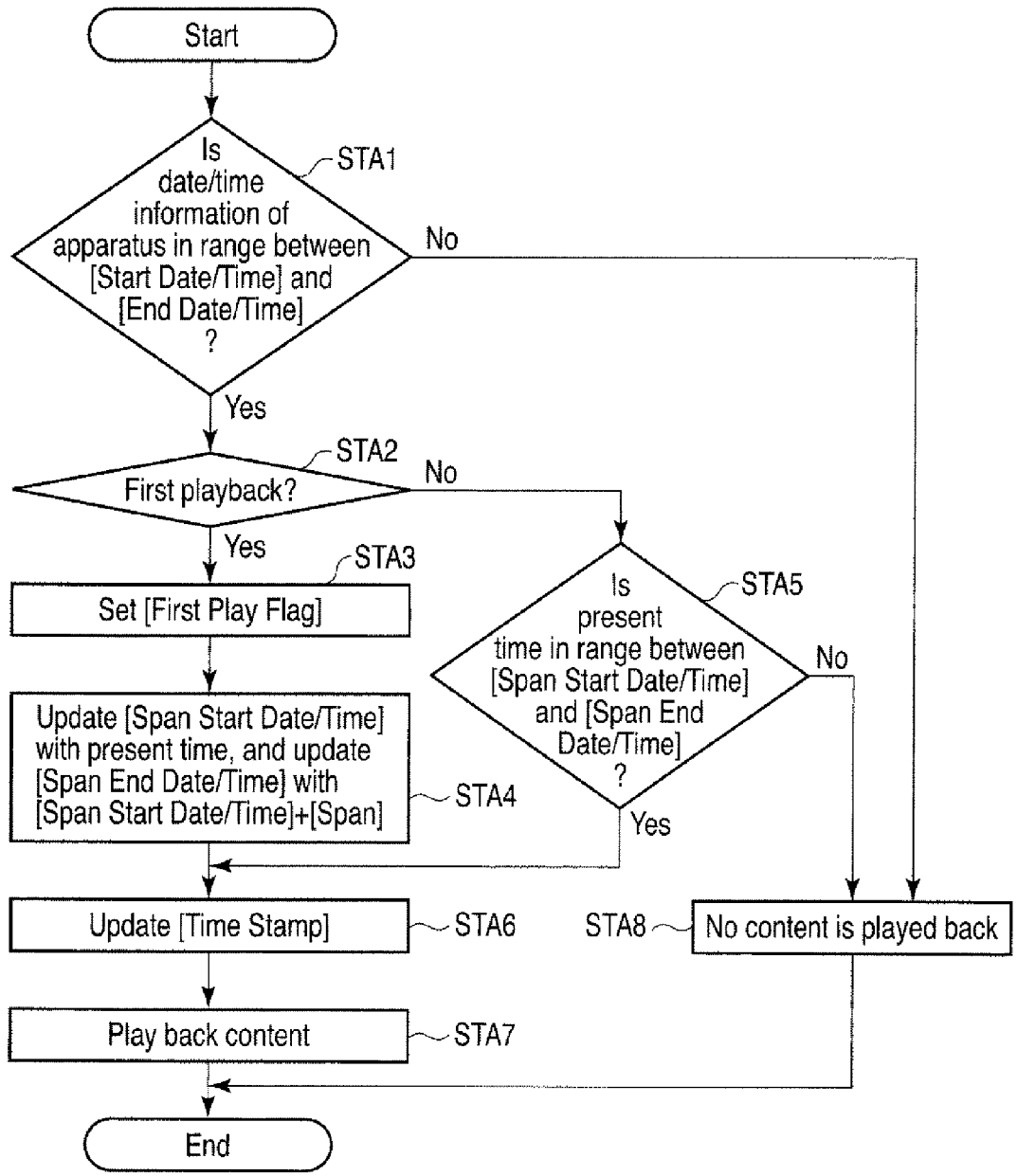
FIG. 4 is a flow chart for describing an example of a playback method of the content of the recording medium including the time management information shown in FIG. 2.

Referring to FIG. 4, a description is given of a playback method for playing back the content information of the recording medium in which the above-described time management information is recorded. In the case where a recording medium, in which the above-described time management information is recorded, is connected to the media slot of the content playback apparatus, the CPU module of the content playback apparatus confirms whether the date/time information of the apparatus is between [Start Date/Time] and [End Date/Time] at the time of starting playback of the content information (step STA1). If the date/time information of the apparatus is outside the range between [Start Date/Time] and [End Date/Time], the content information is not played back (step STA8).

If the date/time information, which is acquired from the clock, is in the range between [Start Date/Time] and [End Date/Time], the CPU module confirms [First Play Flag] (step STA2). In the case of first playback (Reset), [First Play Flag] is set (step STA3). Further, [Span Start Date/Time] is updated with the present time, and [Span End Date/Time] is updated with a value that is calculated by adding [Span Start Date/Time] and [Span] (step STA4).

Subsequently, the CPU module updates [Time Stamp] with the present time that is acquired from the apparatus (step STA6), and executes playback (step STA7).

In the case where playback is not first playback, the CPU module confirms whether the present time is in the range between [Span Start Date/Time] and [Span End Date/Time] (step STA5). If the present time is not in the range between [Span Start Date/Time] and [Span End Date/Time], no playback is executed (step STA8).

If the present time is in the range between [Span Start Date/Time] and [Span End Date/Time], the date/time of [Time Stamp] is updated with the present time that is acquired from the apparatus (step STA6), and playback is executed (step STA7). The date/time of [Time Stamp] is updated when playback is stopped.

In the case where the content playback apparatus, which has executed the playback of the content as described above, includes a clock which is managed by the Mode A method and the time of this clock is set, for example, at a future time relative to the present time, the time management information in the recording medium would be set with future clock information by the above-described process.

Now assume such a case that after erroneous time management information is recorded by the content playback apparatus having the clock that is managed by the Mode A method, the content information is to be played back by a content playback apparatus having a clock which is managed by the Mode B method, or by another content playback apparatus having a clock which is managed by the Mode A method. In this case, for example, if the present time is prior to the start date/time ([Span Start Date/Time]) of the content playback allowable period that is recorded by the above-described process, the content information would fail to be played back, despite the present time being within the content playback allowable period.

The content playback apparatus according to the present embodiment is a time management apparatus including a time management unit 90A which corrects the time management information with correct time information, for example, in a case where it is necessary to correct the time management information, as described above. The time management unit 90A includes a module which corrects the start date/time information ([Span Start Date/Time]) of the playback allowable period and the end date/time information ([Span End Date/Time]) of the playback allowable period, by using the time information that is acquired from the clock 60.

If the recording medium, in which the time management information based on the time information of the clock that is managed by the Mode A method, as described above, is set in the media slot 10, the time management unit 90A corrects [Span Start Date/Time] and [Span End Date/Time] by a difference between [Time Stamp] and the present time, and updates [Time Stamp] with the present time.

Figure 5:
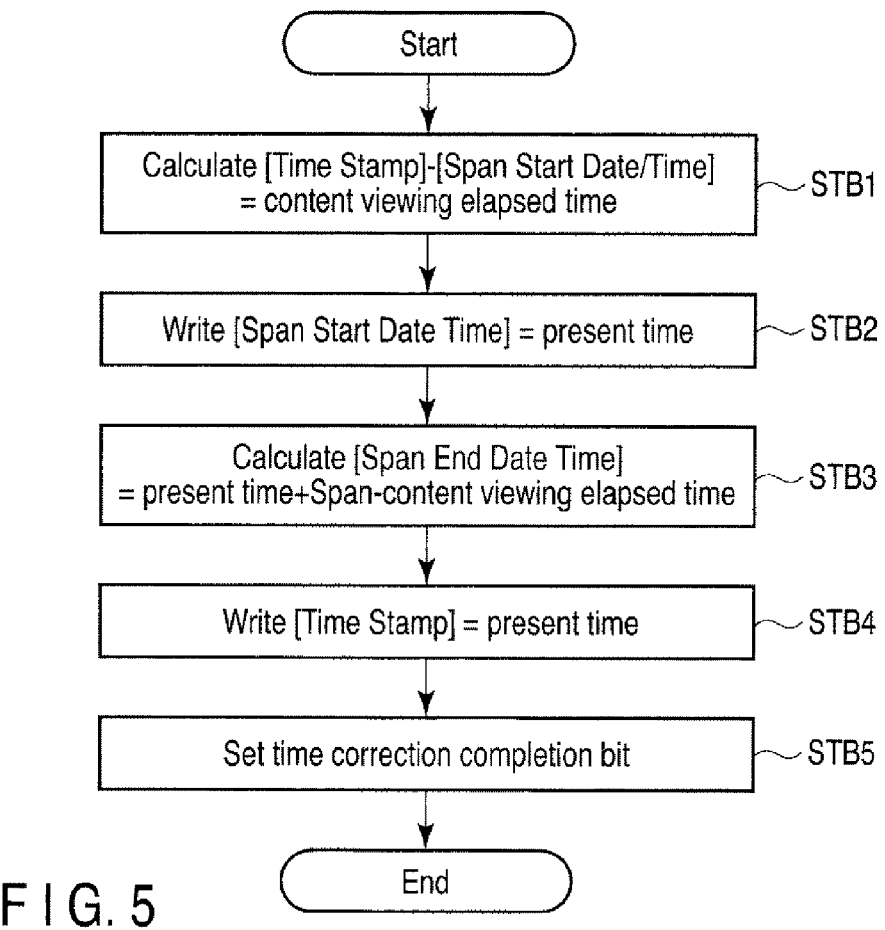
FIG. 5 is an exemplary flow chart for describing an example of a time management method of the content playback apparatus according to the embodiment of the invention.

Specifically, as shown in FIG. 5, the time management unit 90A subtracts the date/time of [Span Start Date/Time] information from the date/time of [Time Stamp] information which was updated when the previous playback was stopped, and calculates a content viewing elapsed time (step STB1). Subsequently, the time management unit 90A writes the present time, which is obtained from the clock 60 that is managed by the Mode B method, as [Span Start Date Time] (step STB2).

Then, a value, which is obtained by subtracting the content viewing elapsed time from a value that is calculated by adding the present time and the value of [Span] information, is written as [Span End Date Time] (step STB3). The present time is written as [Time Stamp] (step STB4), and time correction completion information ([Correction-Completed Flag]) is set (step STB5).

If the time correction completion information is set as described above, it becomes possible to output a message for prompting the user to confirm whether the clock of the content playback apparatus is correct or not, for example, by module of the display device or speaker, in the case where the content is played back at the next time by some other content playback apparatus. Following the output of this message, the time correction completion information may be reset, for example, upon the user's consent.

By correcting the time management information as described above, the content can be played back by correcting the time management information even if the time management information is erroneously recorded.

Therefore, according to the content playback apparatus (time management apparatus) and the time management method thereof relating to the present embodiment, there can be provided a time management apparatus and a time management method, which can correct a time management function and enables playback of to-be-played-back information, even in the case where erroneous information is recorded as time management information.

The present invention is not limited directly to the above-described embodiment. In practice, the structural elements can be modified and embodied without departing from the spirit of the invention. For example, although the above-described content playback apparatus includes the display device 30 and speaker 40, the display device and speaker may be externally connected.

In the above-described content playback apparatus, the recording medium, such as an SD card, is connected. Alternatively, the recording module, which is connected to the content playback apparatus, may be a hard disk drive (HDD), a USB memory, a CD, a DVD, etc.

Accordingly, the above-described content playback apparatus, which includes, as the read module, the media slot to which the recording medium is connected, may alternatively include a read module which reads information that is recorded on a recording medium such as a CD or a DVD, or a read module which reads information that is recorded in, e.g. a hard disk drive or a USB memory.

The recording module may be of any type in which to-be-played-back information and time management information thereof are recorded together, and the read module may be of any type which reads information from such a recording module. In this case, too, it is possible to obtain the same advantageous effects as with the content playback apparatus and the time management method of the content playback apparatus according to the above-described embodiment.

Various inventions can be made by properly combining the structural elements disclosed in the embodiment. For example, some structural elements may be omitted from all the structural elements disclosed in the embodiment. Furthermore, structural elements in different embodiments may properly be combined.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The various modules of the systems described herein can be implemented as software applications, hardware and/or software modules or components on one or more computers, such as servers. While the various modules are illustrated separately, they may share some or all of the same underlying logic or code.

What is claimed is:

1. A time management apparatus comprising:
a read module which reads information that is recorded in a recording medium;
a clock module; and
a control module which controls the read module and the clock module,
wherein content information, time management information which is recorded by an apparatus managing a clock with an arbitrary change of time by a user and time correction completion information which is updated in a case where the time management information has been corrected are recorded in the recording medium, the time management information including date/time recording information indicative of a date/time at which previous playback of the content information is stopped, playback allowable period information indicative of a playback allowable period of the content information, start date/time information indicative of a start date/time of a playback allowable period and end date/time information indicative of an end date/time of the playback allowable period, and
the control module includes (i) a module which calculates a viewing elapsed time by subtracting a value of the start date/time information of the playback allowable period from a value of the date/time recording information which is read out of the recording medium, (ii) a module which sets the start date/time information of the playback allowable period to be a present time which is acquired from the clock module, (iii) a module which sets the end date/time information of the playback allowable period to be a value which is calculated by subtracting the viewing elapsed time from an added result of the present time and a value of the playback allowable period information, and (iv) a module which updates the time correction completion information after correction of the start date/time information of the playback allowable period and the end date/time information of the playback allowable period,
wherein the control module, the read module and the clock module are hardware.

2. A time management method for playing back content information of a recording medium, in which the content information, time management information which is recorded and time correction completion information which is updated in a case where the time management information has been corrected are recorded in the recording medium, the time management information including date/time recording information indicative of a date/time at which previous playback of the content information is stopped, playback allowable period information indicative of a playback allowable period of the content information, start date/time information indicative of a start date/time of a playback allowable period and end date/time information indicative of an end date/time of the playback allowable period, the method comprising:
calculating by a processor a viewing elapsed time by subtracting a value of the start date/time information of the playback allowable period from a value of the date/time recording information which is read out of the recording medium;
writing by the processor, as the start date/time information of the playback allowable period, a present time which is acquired from a clock module;

writing by the processor, as the end date/time information of the playback allowable period, a value which is calculated by subtracting the viewing elapsed time from an added result of the present time and a value of the playback allowable period information; and updating by the processor the time correction completion information, after the writing the start date/time information of the playback allowable period and the writing the end date/time information of the playback allowable period.

3. A time management apparatus comprising:

a read module which reads information that is recorded in a recording medium, the information comprises (a) content information, (b) time management information which is recorded by an apparatus mounting a method of managing a clock with an arbitrary change of time by a user and (c) time correction completion information which is updated in a case where the time management information has been corrected are recorded in the recording medium, the time management information including (i) date/time recording information indicative of a date/time at which previous playback of the content information is stopped, (ii) playback allowable period information indicative of a playback allowable period of the content information, (iii) start date/time information indicative of a start date/time of a playback allowable period and (iv) end date/time information indicative of an end date/time of the playback allowable period;

a clock module; and a processor that controls the read module and the clock module, the processor calculates a viewing elapsed time by subtracting a value of the start date/time information of the playback allowable period from a value of the date/time recording information which is read out of the recording medium, sets the start date/time information of the playback allowable period to be a present time which is acquired from the clock module, sets the end date/time information of the playback allowable period to be a value which is calculated by subtracting the viewing elapsed time from an added result of the present time and a value of the playback allowable period information, and updates the time correction completion information after correction of the start date/time information of the playback allowable period and the end date/time information of the playback allowable period.

* * * * *